United States Patent [19]

Iyengar et al.

[11] Patent Number: 5,360,626

[45] Date of Patent: * Nov. 1, 1994

[54] FAT SOLUBLE POLYMERS AND THEIR USE IN FOODS

[75] Inventors: Radha Iyengar, Belmont; Mark L. Shulman, Waltham; Akiva T. Gross, Newton, all of Mass.

[73] Assignee: Opta Food Ingredients, Inc., Bedford, Mass.

[*] Notice: The portion of the term of this patent subsequent to Aug. 11, 2009 has been disclaimed.

[21] Appl. No.: 41,938

[22] Filed: Apr. 2, 1993

Related U.S. Application Data

[63] Continuation-in-part of Ser. No. 923,258, Jul. 31, 1992, abandoned, which is a continuation of Ser. No. 579,482, Sep. 7, 1990, Pat. No. 5,137,743.

[51] Int. Cl.$^5$ .................. A23D 7/00; A23D 9/00
[52] U.S. Cl. .................. 426/601; 426/417; 426/573; 426/602; 106/244; 524/322; 523/511
[58] Field of Search ............... 426/601, 602, 573, 417; 106/244; 524/322; 523/511

[56] References Cited

U.S. PATENT DOCUMENTS

| | | | |
|---|---|---|---|
| 2,072,068 | 2/1937 | Ellis | 526/604 |
| 2,376,823 | 5/1945 | Scrutchfield | 426/604 |
| 3,227,559 | 1/1966 | Radlove | 426/417 |
| 3,563,767 | 2/1971 | Wasserman et al. | 99/123 |
| 3,600,186 | 8/1971 | Mattson et al. | 99/1 |
| 3,876,794 | 4/1975 | Rennhard | 426/152 |
| 3,966,632 | 6/1976 | Collipoulos et al. | 426/244 |
| 4,098,913 | 7/1978 | Baugher | 426/104 |
| 4,103,038 | 7/1978 | Roberts | 426/601 |
| 4,284,655 | 8/1981 | Miller et al. | 426/602 |
| 4,508,746 | 4/1985 | Hamm | 426/601 |
| 4,517,360 | 5/1985 | Volpenheim | 536/119 |
| 4,626,443 | 12/1986 | Takahashi et al. | 426/602 |
| 4,839,192 | 6/1989 | Sagi et al. | 426/607 |
| 4,840,815 | 6/1989 | Meyer et al. | 426/611 |
| 4,849,243 | 7/1989 | Screenivasan et al. | 426/602 |
| 4,915,974 | 4/1990 | D'Amella et al. | 426/611 |
| 4,948,617 | 8/1990 | Dartey et al. | 426/602 |
| 5,137,743 | 8/1992 | Zaks et al. | 426/602 |

FOREIGN PATENT DOCUMENTS

| | | |
|---|---|---|
| 2321244 | 3/1977 | France . |
| 1220488 | 1/1971 | United Kingdom . |
| 1371792 | 10/1974 | United Kingdom . |
| 2178752A | 2/1987 | United Kingdom . |
| 2205726A | 12/1988 | United Kingdom . |

OTHER PUBLICATIONS

Hanabusa, K. et al., (1993), "Small Molecular Gelling Agents to Harden Organic Liquids: Alkylamide of N-Benzyloxycarbonyl-L-valyl-L-valine", *J. Chem. Soc. Chem. Com.*, pp. 390–392.

*Primary Examiner*—Helen Pratt
*Attorney, Agent, or Firm*—Hamilton, Brook, Smith & Reynolds

[57] ABSTRACT

Texturized oils and oil-continuous emulsions are prepared by combining liquid oils with edible polymers. The resulting texturized oils and emulsions are gelled substances having a fat-like consistency which approximates the viscoelastic properties of solid fats, such as butter, margarine or hydrogenated vegetable oils, but contain no saturated fats. These texturized oils and emulsions can be used as a substitute for solid fats in food products and to make high-quality spreads containing reduced amounts of saturated fat.

18 Claims, 2 Drawing Sheets

$R = CH_3-(CH_2)_n-CO-$
$n = 14-16$ $R = CH_3-(CH_2)_n-CO-$
$n = 14-16$

FAT SOLUBLE POLYMERS AND THEIR USE IN FOODS

RELATED APPLICATIONS

This application is a Continuation-in-part application of U.S. Ser. No. 07/923,258, filed Jul. 31, 1992, now abandoned, which is a Continuation application of U.S. Ser. No. 07/579,482, filed Sep. 7, 1990 and issued as U.S. Pat. No. 5,137,743, the entire teachings of which are incorporated herein by reference.

BACKGROUND

Fat is an important part of the diet of all individuals. It serves as a source of energy and essential fatty acids, and also as a carrier for fat-soluble vitamins. In addition, due to its unique functional properties, fat is often used to improve the overall quality of foods including color, texture, structure, flavor, mouthfeel and other characteristics.

However, both the total desirable amount of fat and types of fat in the diets of individuals have been a subject of controversy. A number of investigations revealed a correlation between high consumption of fats and increased rates of atherosclerosis, coronary artery disease and obesity. As a result, several organizations, including the American Heart Association, U.S. Department of Agriculture and Department of Health, have recommended the reduction of total fat intake in general and of saturated fat in particular.

The nutritional and biological effects of fatty acids are diverse. As long as 30 years ago, it was observed that diets composed predominantly of saturated fatty acids increased plasma lipids, whereas diets containing polyunsaturated fats decreased plasma lipids. More recent findings indicate that even monounsaturated fatty acids, such as oleic acid, can be hypolipidemic. F. H. Mattson and S. M. Grundy, *J. Lipid Res.*, 26:194 (1985). It is now well accepted that not only the total amount of fat, but also the composition of dietary fat which is consumed affects the incidence of coronary arterial disease.

The relative proportion of saturated to unsaturated fats consumed in the U.S. has changed significantly. The consumption of fats derived from vegetable oils that are rich in unsaturated fatty acids has more than doubled in the last 50 years. R. L. Rizek, et al., *In Dietary Fats and Health*, E. G. Health and W. J. Vesek, (eds.) American Oil Chemists' Society, Champaign, Ill., p. 17 (1983). However, in a number of food products, the complete substitution of saturated fats with unsaturated fats is often problematic. The functional properties of fats in different foods are determined by a number of parameters, including the balance between solid and liquid phases and the structure of the fat crystal.

Fats can crystallize into different crystal forms. The consistency, plasticity, graininess, and other physical properties of many products such as butter, lard, margarine, shortenings, and cocoa butter, all depend on a particular polymorphic form of the triglyceride present. As a result, only a certain part of solid saturated fat can be substituted with liquid unsaturated oils without sacrificing the sensory quality of the product.

An alternative material that can mimic the physical and structural properties of saturated fats without having unfavorable nutritional qualities would be valuable for reducing the amount of saturated fat in a food product without sacrificing the sensory quality of the food product.

SUMMARY OF THE INVENTION

The invention relates to an oil or fat which contains a polymeric, fat-soluble material and its use for the modification of the physical properties of fats and oils. The polymeric material that can be used in the present invention includes non-nitrogen containing, oil-soluble polymers, such as alkyd-type polyesters, polymers based on hydroxyacids and natural polymers, such as cutin, poly(vinyl esters), polyglycol esters and polyacrylates. Alkyd-type polyesters are particularly useful in the present invention.

The polymers are used in fat formulations wherein all or a portion of the fat is substituted by a mixture or an emulsion containing a liquid fat and the polymer. In one embodiment, the polymeric, fat-soluble material is used as a texturing agent for oils. The polymer is added to neat oils to change the physical characteristics of the oils, such as the melting point and viscosity. Liquid oils composed of mostly unsaturated fatty acids solidify or form gels at room temperature in the presence of even small amounts of the polymer.

The polymer also helps to stabilize and solidify emulsions. In this embodiment, the polymer is incorporated into an oil-in-water or water-in-oil emulsion, forming a material having the physical and structural characteristics of saturated fat but which contains no saturated fat.

The present oils or emulsions treated with the oil-soluble polymers can be used to reduce the amount of saturated fat in foods. Use of the present treated oils or emulsions allows all or part of the saturated fat in a food to be replaced by unsaturated oils while still retaining desirable sensory or physical qualities of the food product.

DETAILED DESCRIPTION OF THE INVENTION

Figure 1:
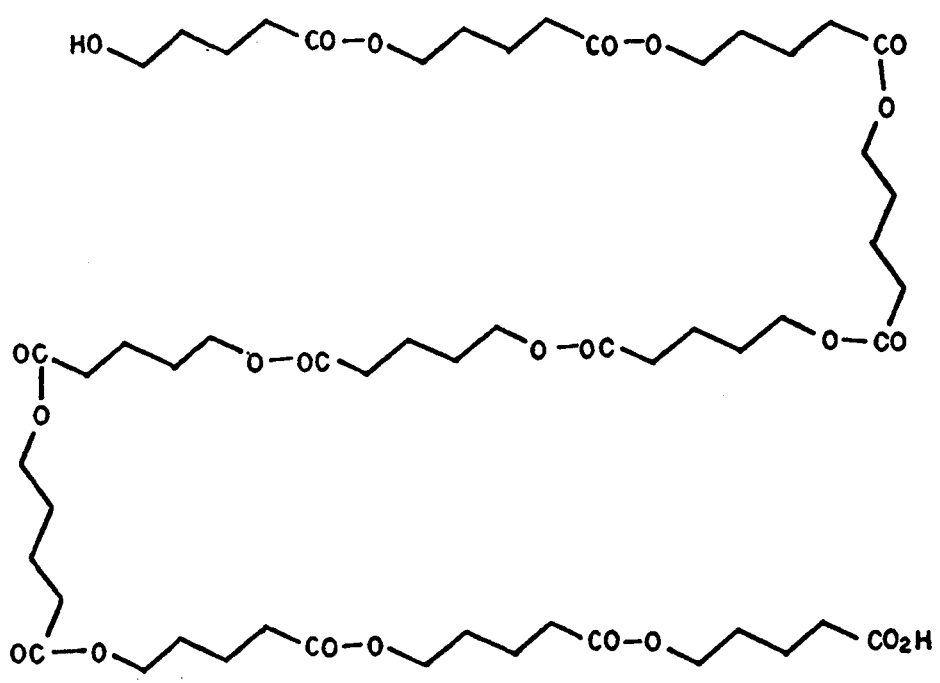
FIG. 1 is a schematic representation of a polymer product made by the polycondensation of hydroxyacids.

Polymers useful in the present invention are non-nitrogen containing, oil-soluble polymers which when added to a liquid oil or fat, cause a change in the textural properties of the oil or fat. Polymers suitable for this purpose, for example, include natural polymers, such as cutin, polymers based on hydroxy acids, polymers prepared by the condensation of polyhydric alcohols and polybasic acids, polymers derived from poly(vinyl alcohols), fatty acid esters of acrylates, and poly(ethylene glycol) fatty acid derivatives.

The term "oil-soluble" is intended to mean a polymer that is capable of dissolution or colloidal dispersion in an oil medium under mild conditions without excessive heating or shear conditions. It is preferred that the oil-soluble polymers of this invention contain long chain, straight or branched alkyl substituents, for example, alkyl chains having 6 to 40 carbon atoms in length, with 8 to 30 carbon atoms being preferred. The presence of the alkyl groups contributes to the oil thickening or emulsion thickening activity of the polymer.

Polymers which are particularly useful are members of the class of polymers generally known as "alkyd" polymers. Alkyd polymers are characterized in that they are generally prepared by reaction of a polyhydric alcohol, a polybasic acid and a fatty acid or an oil, usually in its monoglyceride form. Alkyd polymers can be prepared by any one of several known methods. For example, alkyd-type polymers were prepared by Van Bemmelen in 1856 by condensing succinic anhydride with glycerol. Van Bemmelen, *J. Prakt. Chem.*, 69:84 (1856). In the so-called Fatty Acid method, a fatty acid, a polyol and an anhydride are mixed together and allowed to react. The Fatty Acid Monoglyceride method includes a first step of esterifying the fatty acid with glycerol, and when the first reaction is complete, adding an acid anhydride. The reaction mixture is then heated and the polymerization reaction takes place. In the Oil Monoglyceride Method, an oil is reacted with glycerol to form a mixture of mono, di, and triglycerides. This mixture is then polymerized by reacting with an acid anhydride. B. Parkyn, F. Lamb and B. V. Clifton, *Polyesters* (1967), Iliffe Books, London, Vol. 2; T. C. Patton, *In: Alkyd Resins Technology,* Wiley-Interscience, New York (1962). Alkyd polymers made by these and other methods can be used in the present invention.

Glycerol is a commonly used polyhydric alcohol due to its abundance and cost. In addition to glycerol, a number of other polyols such as glycols, polyglycerols, polyglycerol esters, sugars and sugar alcohols can be used as starting materials for producing the present edible polymers. Monoglycerides, which contain reactive hydroxy groups and a fatty acid are particularly useful starting materials.

Polybasic acids which can be used include natural edible multifunctional carboxylic acids, such as, for example, citric, succinic, malic, fumaric, maleic or adipic acid, or the corresponding anhydrides. A variety of fatty acid can be used in preparing alkyd polymers, for example, fatty acids which generally occur in vegetable or fish oils.

The composition, molecular weight, and viscoelastic properties of the resulting polymers depends on the choice of starting materials and on the synthetic method used. For example, the number of reactive hydroxy groups on the polyhydric alcohol will affect the properties of the polymer. In general, the greater the number of reactive hydroxy groups, the more viscous, less soluble, harder and less flexible the polymer becomes. The glycols, for example, which have two reactive hydroxy groups, produce only straight chain, linear polymers, which are soft and flexible. Glycerol has three reactive hydroxy groups, thus, reaction with a single molecule of dibasic acid leaves one reactive hydroxyl, which is available for crosslinking, and a three-dimensional network develops. Polyhydric alcohols having more than three reactive hydroxy groups would tend to form an even tighter crosslinked network. In many alkyd polymers which are based on glycerol, for example, one hydroxyl group will be reacted with a fatty acid, and the other two will form the ester linkages with the acid. Thus, the properties of an alkyd polyester can also be modified by the choice of fatty acid which is used.

The choice of the polybasic acid also affects the properties of the polymer. Dicarboxylic acids or anhydrides are generally used to form the present polyester polymers. However, triacids can be used, which result in a polymer containing a free carboxyl group, which can be crosslinked or be derivatized to impart desired properties to the polymer.

Finally, alkyd resins can be terminated using monohydric alcohols (e.g., diglycerides) or monobasic acids (e.g., fatty acids). The choice of the terminal groups will depend in part on the properties of the polymer. For example, long-chain fatty acids are used where increased oil solubility is desired.

Figure 2:
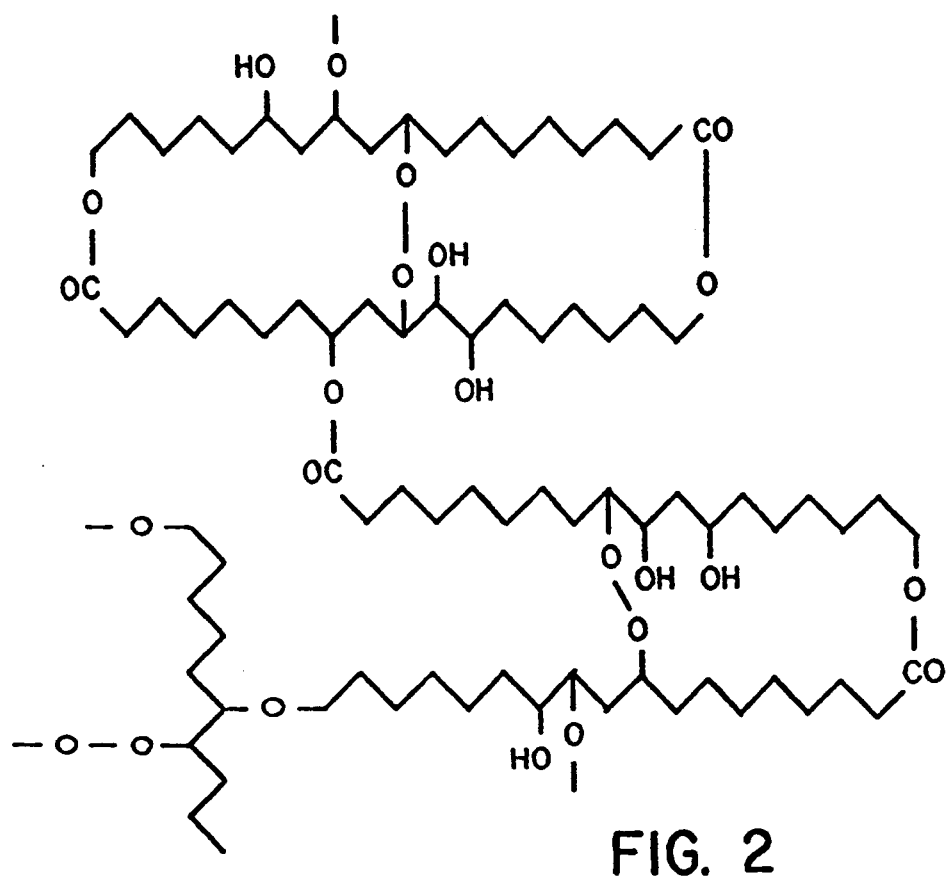
FIG. 2 is a schematic representation of the structure of cutin.

The polymers useful in the present invention can also be made from other starting materials which result in the formation of ester bonds. For example, the condensation of hydroxyacids, such as gluconic acid, glucoheptonic acid or ω-hydroxy fatty acids with themselves or with the appropriate polyfunctional molecule for forming polyesters, can result in the desired oil-soluble polymers. A polymer prepared by the polycondensation of hydroxyacids is shown schematically in FIG. 1. Cutin, a naturally occuring polymer of this type is shown in FIG. 2.

Figure 3:
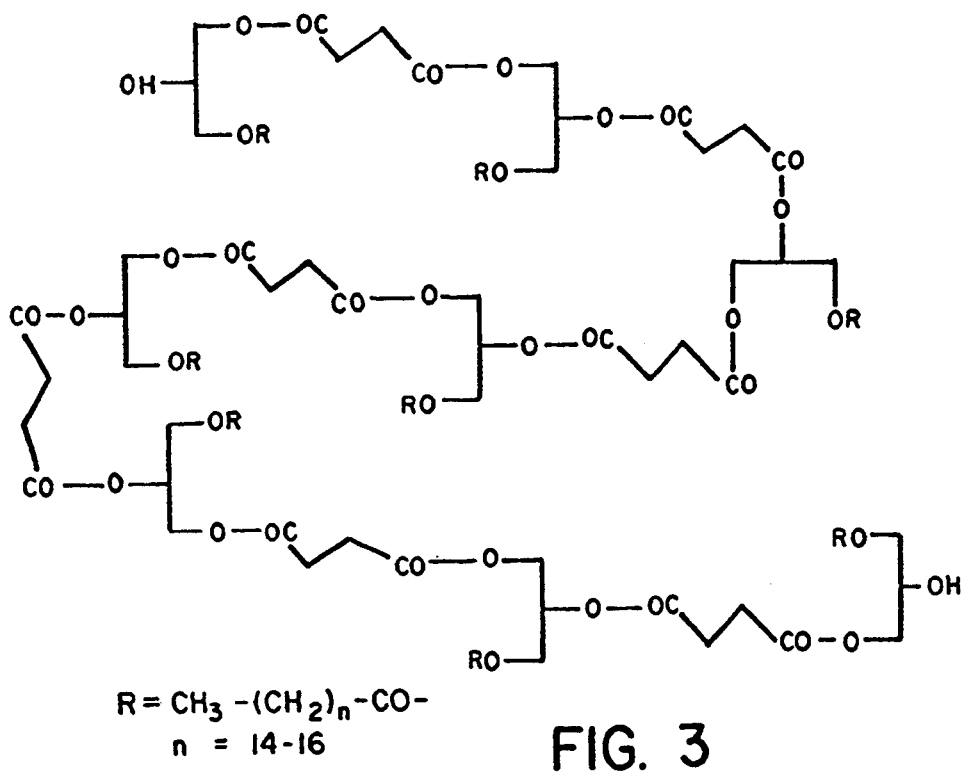
FIG. 3 is a schematic representation of a polymer formed by a polycondensation reaction between succinic anhydride and 1-monoglycerides.
Figure 4:
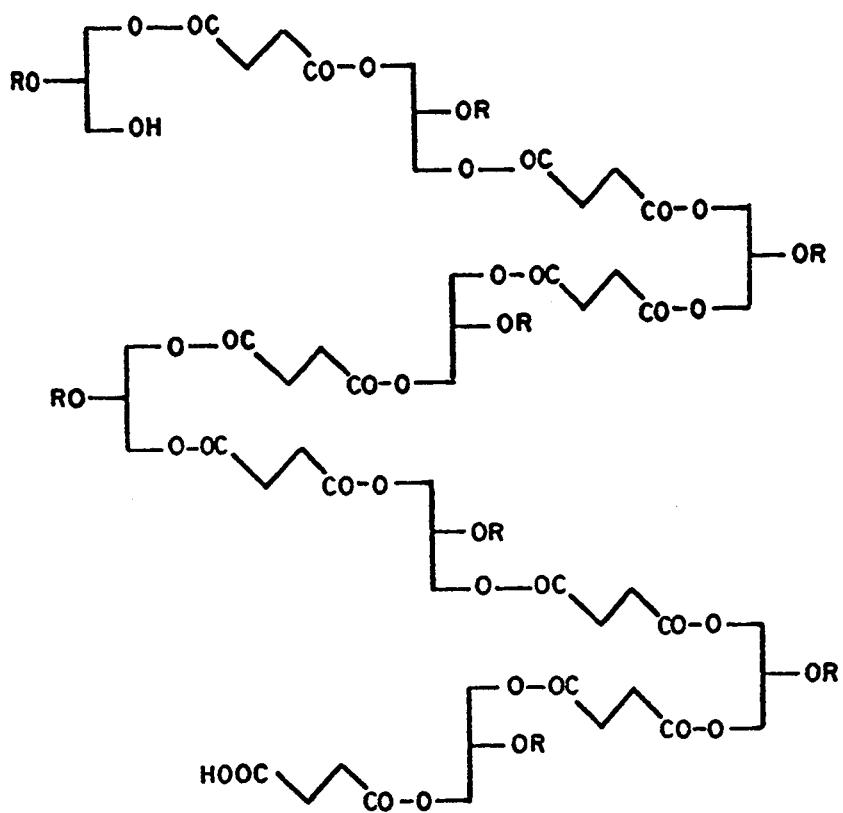
FIG. 4 is a schematic representation of a polymer formed by a polycondensation reaction between succinic anhydride and 2-monoglycerides.

Alkyd-type polyesters formed by the reaction of natural dicarboxylic acids and monoglycerides are preferred. Natural dicarboxylic acids which are preferred include citric acid, succinic acid, malic acid, fumaric acid, maleic acid and adipic acid. The corresponding anhydrides can be used in place of the diacids. Preferred monoglycerides are monoglycerides derived from natural vegetable oils such as sunflower oil, safflower oil, soybean oil, canola oil, olive oil, peanut oil and corn oil. An alkyd-type polymer prepared by the condensation of citric acid and 1-monoglycerides is described in Example 1. An alkyd-type polymer formed by the condensation of succinic anhydride and 1-monoglycerides is shown schematically in FIG. 3. An alkyd-type polymer formed by a condensation reaction between succinic anhydride and 2-monoglycerides is shown schematically in FIG. 4. Polymers having a molecular weight of at least 2000 daltons are particularly useful.

Alkyd-type polyesters are widely used by the coating industry in a variety of products including resins, enamels, varnishes and paints. In relation to food products, they are used as coatings for food containers, for deodorizing coating paper, and for corrosion protection in the meat and dairy industries.

In addition to the polyester texturizing agents described above, other classes of oil-soluble polymers having oil thickening and/or emulsifying properties include polyvinyl alcohol fatty acid esters (e.g., polyvinyl stearate) and crosslinked polymers thereof (e.g., sebacoyl chloride crosslinked poly(vinyl stearate)). These polymers can be prepared by polyvinyl alcohol condensed with a fatty acid, fatty acid chloride or fatty acid anhydride. Examples of some fatty acids include oleic, palmitoleic, linoleic, linolenic, butyric, palmitic and stearic. Fatty alcohol esters of methacrylate polymers, such as polyhexadecylmethacrylate and polyoctadecylmethacrylate, can be used as texturizing agents. These polyacrylates are commercially available but could be synthesized using known synthetic methodologies. Alternatively, polyglycol esters such as polyethylene glycol distearate, have suitable oil texturizing properties. Polyglycol esters that are suitable for this purpose are commercially available.

The unique feature of the polymers described herein is that their presence in liquid oils, even in small amounts, changes the viscoelastic properties of the oil significantly. It has been discovered, for example, that the presence of about 5% by weight of a polyester formed by the condensation of monoglycerides and citric acid, causes a liquid oil to thicken or gel. The viscoelastic properties of the resulting thickened or gelled mixture resemble that of partially hydrogenated fats.

Thickened or gelled mixtures made from liquid oils that have been treated with oil-soluble polymers can be used as a substitute for partly or fully hydrogenated fats in food products. Liquid oils, such as sunflower oil, safflower oil, soybean oil, canola oil, olive oil, peanut oil or corn oil are mixed with an amount of the polymer sufficient to thicken or texturize the oil so that it has the desired textural properties. The term "texturize" as used herein means that desired characteristics such as viscosity, melting point, structure or plasticity, are imparted to the material. Most liquid oils gel, for example, in the presence of from about 2 to about 20% (by weight) of the polymer. The polymer can also be added to saturated or partially saturated fats such as hydrogenated (or partially hydrogenated) vegetable oil, butter fat or cocoa butter, to produce a fat-like mixture having a reduced level of saturated fat. The viscoelastic properties of the resulting mixture resembles those of partially hydrogenated fats. The thickened oils can be used as a substitute for solid fat in the production of baked goods.

The modified oil materials formed from the mixture of the polymer and the liquid oil demonstrate extremely useful melting properties; for example, they have a melting point range of about 37°–40° C., which approximates body temperature. In food products, particularly those based on fatty materials, such as margarines, spreads or confections, a clean and rapid mouthmelt is desired. This rapid mouthmelt is characteristic of cocoa butter, which is a standard for blends incorporating saturated and unsaturated fats. The present invention can achieve the mouthmelt standard of cocoa butter without the use of solid, saturated fats.

Products that currently contain added solid fats include, for example, spreads, margarines, baked goods, frostings, chocolate and ice creams. The amount of saturated fat in these and other fat-containing foods can be reduced significantly by replacing all or part of the saturated fat with gelled oils made by the present method.

In one embodiment of the present invention, baked goods made with liquid oil stock and no structural fats are produced. In this embodiment, the hydrogenated or partly hydrogenated fats are substituted with the present modified oils consisting of mixtures of liquid unsaturated oils with oil-soluble polymers. In this method, liquid oils are thickened or texturized by adding an amount of the oil-soluble polymer sufficient to cause the oil to thicken to the desired degree, as described above. The thickened or gelled oils are used in place of some or all of the hydrogenated or partially hydrogenated fat in the recipe.

Solid fats (e.g., butter, margarine, shortening) are used in baking applications for a number of reasons. In stabilized-foam products such as cakes, breads and other baked goods, for example, solid fats affect the batter viscosity, cell volume, cool texture and finished height of the product. In simple non-leavened food systems, such as flaky pie crust, the solid fat contributes significantly to dough lamella formation and subsequent flaky texture. The same results can be obtained if all or a portion of solid fat is replaced with a texturized oil of the present invention.

In another embodiment of the present invention, high quality, low-fat spread emulsions made with liquid oil stock and containing no saturated fats can be produced.

An unexpected observation was made that oil-soluble polymers can stabilize emulsion without the use of other known emulsifying agents. The polymers stabilize the emulsions and change their melting properties. For example, a 1:1 mixture of water and liquid vegetable oil in the presence of about 3% of an oil-soluble polymer (e.g., succinic acid/monoglyceride polyester) forms a stable, unpourable emulsion. Low-fat spreadable emulsions, of either the water-in-oil or oil-in-water type can be made, for example, using liquid oils which have been treated with a small amount of the polymers. Oil continuous emulsions containing from about 20 to about 80% by weight oil which exhibit the desired type, viscoelastic and textural qualities, i.e., those analogous to solid fats can be produced by this method.

Key to the proper textural development of the spreadable emulsions is the combined action of the aqueous and oil gelling agents present in the mixture. The polymer is used as the gelling agent of the oil phase. It is not necessary to use an aqueous gelling agent to thicken the aqueous phase when the polymers of this invention are used. However, an aqueous gelling agent can optionally, though not preferred, be used in the aqueous phase. Aqueous gelling agents which can be used include, for example, gelatin, xanthan gum, gum arabic, guar gum, pectin, algin, carrageenen and cellulose derivatives. The oil phase comprises an oil which is liquid at room temperature having any desired degree of unsaturation, such as, but not limited to, olive, corn, sunflower, sufflower, soybean or canola oil. "Winterized" liquid oils, which are oils that resist crystallization at low temperatures, e.g., below 40° F., are preferred. The oil phase also includes the polymer, and, optionally, oil-soluble emulsifier(s), colors and flavors. The aqueous phase contains water and an aqueous gelling agent; and can optionally contain salts, milk solids and flavors.

The emulsions generally contain from about 30 to 80% by weight of the oil phase, and about 20 to 70% by weight of the aqueous phase. The oil phase contains from about 1 to 10% by weight of the polymer, and the aqueous phase contains from about 1 to 8% by weight of the aqueous-soluble gelling agent, if necessary.

The emulsion is made according to the following general procedure. The polyester polymer is dispersed in the oil phase and heated to a temperature of from about 40° to about 100° C., after which optional ingredients, such as flavors, colors and emulsifiers, are added. The aqueous phase is prepared by heating the water to a temperature of from about 50° to about 90° C. and optionally adding a gelling agent (or following the suitable procedure for the particular gelling agent), after dissolution of which other optional ingredients, if any, are added. The entire aqueous phase is normally heated to a temperature of from about 60° to about 90° C. for a short time to effect pasteurization. The aqueous phase is allowed to cool to no lower than approximately 50° C., and is mixed with the oil phase under conditions appropriate to form the emulsion.

The emulsion is assembled under shear, using a high speed mixture or homogenizer. In this process, the oil phase is agitated under shear in the receiving vessel and the aqueous phase is slowly added, forming an emulsion of the aqueous phase in a continuous external oil phase. When the emulsification is complete, the vessel is placed in a chilled bath, about 0° C. and the homogenizer speed is reduced. The vessel is spun and the sides of the vessel are scraped to remove and distribute any cooled or crystallized material. The procedure is continued until the emulsion is plasticized, that is until it displays a measurable yield point or until further cooling and mixing is difficult due to the system viscosity.

It is during the scraped surface heat exchange process described above that the polymer in the continuous oil phase thickens the oil to a gelled state. Gelling of the aqueous phase inhibits the mobility of the water by drastically increasing the viscosity of the water phase due to the gelation process. The viscosity of the resulting emulsion at the point of removal from the process apparatus approximates that of a softened butter. The texture of the emulsion (i.e., hardness) gradually increases with refrigerated storage, and until it approximates that of soft spread products currently on the market.

The present invention allows products having characteristics associated with solid fat to be made which completely lack solid fats. Solid fats are saturated or partially saturated fats which form a structure or crystalline network which lends texture and stability to conventional margarines and spread products. In general, attempts at making spread emulsions without a small percentage of added structural fat result in a failed or unstable emulsion. The present method results in a stable emulsion containing no structural solid fat.

The invention will now be illustrated by the following Examples. All molecular weights are weight averages unless otherwise stated and all percents are weight percents unless otherwise stated.

EXEMPLIFICATION

EXAMPLE 1

Synthesis of alkyd-type polymer from monoglycerides and citric acid and preparation of fat spread emulsion Thirty one grams (31 g) of monoglycerides derived from hydrogenated vegetable oil (Myverol 18-06, Kodak, Eastman Chemicals Division, Kingsport, Tenn.) were placed in a round-bottom 100 mL flask and melted at 140° C. Ten grams of citric acid monohydrate (Sigma Chemical Company, St. Louis, Mo.) were then added under stirring. The above weight ratio resulted in 1/1.75 molar ratio of citric acid to monoglycerides. Vacuum was applied (6–10 mm Hg) and the temperature was raised to 180° C. After 30 minutes, 200 mg of p-toluenesulfonic acid catalyst were added and the reaction mixture was stirred at 180° C. and under vacuum for another 22 hours, forming a citrate polymer.

The polymer was cooled to room temperature, homogenized to a powdered state and thoroughly washed with methanol to remove the catalyst. The molecular weight of the resulting polymer (determined by GPC with different MW polystyrenes as standards) was found to be around 9,000. The product melting properties were determined by differential scanning calorimetry (DSC). The melting point was found to be about 49°–51° C. Analysis of a 5% (by weight) solution of the polymer in canola oil revealed an endothermic peak at 40° C. with an enthalpy of 2.1 Joules/gram (J/g).

The resulting citric acid polymer was then used to prepare a high quality fat spread emulsion using liquid oil stock, without adding structural or saturated fat. The emulsion consisted of an aqueous phase, including salts, gelling agent, milk solids and flavors, and an oil phase, which included the polymer, emulsifier(s), color and flavor.

In the formulation, the following components were used to assemble the final emulsion:

|  | % in Final Product |
| --- | --- |
| OIL PHASE |  |
| Canola oil (Procter & Gamble Co.) | 37.4 |
| Dimodan-0 emulsifier (Grindsted Co.) | 0.5 |
| Citric acid polymer | 2.0 |
| Color (1% soln Beta carotene) | 0.05 |
| Flavor (Givaudan F-9093) | 0.05 |
| Total | 40% |
| MILK PHASE |  |
| Water | 55.48 |
| Salt | 1.0 |
| Milk Solids (Carnation Co.) | 1.0 |
| Gelatin (Hormel, 250 Bloom) | 2.5 |
| Flavor, cream; (Quest, Inc.) | 0.01 |
| Flavor, butter; (Chris Hansen Labs) | 0.01 |
| Total | 60% |

The polymer was dispersed in the oil phase and heated to 100° C. after which the flavor, color and emulsifier were added. The aqueous phase was prepared by heating the water to 70° C. and dispersing the gelling agent. Then the remaining ingredients were added. The entire aqueous phase was heated to 80° C. for a short time to effect pasteurization. The aqueous phase was allowed to cool to 50° C. and mixed with the oil phase.

The emulsion was assembled under shear, using a polytron homogenizer. With the oil phase undergoing shear in the receiving vessel, the aqueous phase was slowly added, forming a continuous external oil phase. Care was taken to avoid the inclusion of air in the emulsion. When the emulsification was complete, the vessel was placed in a chilled bath, at 0° C. with the homogenizer speed reduced. The vessel was spun and the sides of the vessel were scraped to remove and distribute the cooled or crystallized material. The procedure was continued until further cooling and mixing by this method was impossible due to the system viscosity. The viscosity of the product at the point of removal from the process apparatus was that of a softened butter. The emulsion was placed in a refrigerator at 4° C. and the hardness gradually increased with refrigerated storage, and until it approximated that of a soft spread product, e.g., margarine.

EXAMPLE 2

Synthesis of Polymer Derived from Monoglycerides and Succinic anhydride and Preparation of Fat Spread Emulsion Twenty grams (20 g) of monoglycerides derived from hydrogenated vegetable oil (Myverol 18-06, Kodak) were placed in a round-bottom 100 mL flask and melted at 140° C. Succinic anhydride (5.3 g; Sigma) was then added under stirring. The above weight ratio resulted a 1:1 molar ratio of succinic anhydride to monoglycerides. The temperature was raised to 200° C. and the reaction mixture was stirred at this temperature for 24 hours, forming a succinylated polymer.

The polymer was cooled to room temperature and homogenized to form a powder. The molecular weight of the resulting polymer as determined by GPC was around 8,900. The product melting properties were then determined by DSC. The product melted at 50° C. DSC scan of a 5% (by weight) solution of the polymer in canola oil revealed an endothermic peak at 39° C. with an enthalpy of 2.0 J/g.

The polymer was then used to prepare fat spread emulsions with liquid oil and no structural or saturated fat. In the formulation, the following components were used to assemble the final emulsion:

|  | % in Final Product |
|---|---|
| OIL PHASE |  |
| Canola oil | 46.6 |
| Dimodan-O emulsifier | 0.5 |
| Succinic acid polymer | 2.5 |
| Refined Lecithin (Nattermann) Phospholipid, Inc.) | 0.2 |
| Color (1% soln. beta-carotene) | 0.05 |
| Flavor (Givaudan F-9093) | 0.15 |
| Total | 50% |
| MILK PHASE |  |
| Water | 44.96 |
| Salt | 1.5 |
| Milk Solids (Carnation Co.) | 1.0 |
| Gelatin | 2.5 |
| Flavor, cream; (Quest, Inc.) | 0.02 |
| Flavor, butter; (Chris Hansen Labs) | 0.02 |
| Total | 50% |

The procedure to form the emulsion was the same as in Example 1. The viscosity of this product was that of a softened butter similar to that produced in Example 1. Its hardness slightly increased with refrigerated storage. No oil separation was observed after 1 week storage at 4° C.

EXAMPLE 3

Synthesis of polymer derived from monoglycerides and malic acid and preparation of fat spread emulsion Twenty eight grams (28 g) of monoglycerides derived from hydrogenated vegetable oil (Myverol 18-06, Kodak) were placed in a round-bottom 100 mL flask and melted at 120° C. Ten grams of malic acid (Sigma) were then added under stirring. The above weight ratio gives 1:1 molar ratio of malic acid to monoglycerides. Four hundred mg of p-toluenesulfonic acid catalyst were added to the reaction mixture, vacuum was applied (6–10 mm Hg) and the mixture was stirred at 120° C. for 3 hr. It became important at this point to have precise temperature control, because malic acid decomposes at 140° C. During the next 4 hours, the temperature was raised slowly to 150° C. The reaction mixture was incubated for 1 hour, then heated to 180° C. and kept at this temperature for another 15 hours forming the polymer.

The polymer was cooled to room temperature, homogenized and thoroughly washed with methanol to remove the catalyst. The molecular weight of the resulting polymer determined by GPC was around 6,400. The product melting properties were then determined by DSC. The melting point was found to be around 48° C. Scans of a 5% (by weight) solution of the polymer in canola oil revealed an endothermic peak around 30° C. with an enthalpy of 2.7 J/g.

The polymer was then used to prepare fat spread emulsions with liquid oil stock and no structural or saturated fat. Composition of the phases and the preparation method was as described in Example 2. The resulting product was a firm stable butter-like emulsion. No oil separation was observed upon storage at 4° C. for 1 week.

EXAMPLE 4

Pie crust formulation using citrate polymer/canola oil emulsion

A citrate polymer was prepared as described in Example 1. It was then used in combination with canola oil as a substitute for CRISCO ® brand shortening in pie crust. Positive and negative controls were used for comparison. The following formulation was used to make the pie crusts:

|  |  | % in Final Product |  |
|---|---|---|---|
| Component | Test material | Positive control | Negative control |
| Shortening (CRISCO ® Brand) | 0 | 25.66 | 0 |
| Canola Oil | 0 | 0 | 25.66 |
| Canola Oil containing 7% polymer | 25.66 | 0 | 0 |
| Flour | 51.35 | 51.35 | 51.35 |
| Salt | 1.6 | 1.6 | 1.6 |
| Ice water | 21.39 | 21.39 | 21.39 |
| Total | 100 | 100 | 100 |

The polymer (7% by wt.) was dispersed in the canola oil and heated to approximately 100° C. The mixture was then cooled and stored at 4° C. until use. Salt, flour and the shortening or oil were mixed together in a bowl. Water was then added to form a dough. The dough was refrigerated for 2 hours, rolled into ⅛" thick circles and baked at 445° F. for 8 minutes. Test material and positive control exhibit similar texture and flakiness, as well as similar in-mouth properties. The negative control was somewhat softer, flat and dense with poor in-mouth feel and little flakiness.

EXAMPLE 5

Synthesis of crosslinked polymer derived from poly(vinyl alcohol) molecular weight 9000–10,000, stearoyl chloride and sebacoyl chloride.

Poly(vinyl alcohol), average molecular weight 9000–10,000 (880 mg, 20 mM based on vinyl alcohol; Aldrich Chemical Co.) was dissolved in dry N,N-dimethylformamide (10 mL). A mixture of stearoyl chloride (6.06 g, 20 mM; Aldrich Chemical Co.) and sebacoyl chloride (48 mg, 0.2 mM; Aldrich Chemical Co.) were dissolved in dry N,N-dimethylformamide (10 mL) and then added to the dissolved poly(vinyl alcohol). The solution was stirred at 25° C. After approximately 10 minutes a white solid precipitated. The stirring was continued for 3.5 hours. The mixture was then poured into dry methanol (200 mL) and the resulting precipitate was filtered under vacuum. The solid was air dried to give 4.10 g of the crude polymer (66% yield). The molecular weight of the crude polymer (determined by GPC using a PL-Gel mixed pore C column; Polymer Laboratories; with different molecular weight polystyrene as standards and a refractive index detector) was found to be a mixture of weight averages 102,000 and 850 in a ratio of 4:1. The polymer was purified by recrystallization from boiling ethanol to give 2.50 g of the derivatized poly (vinyl alcohol) . The polymer was characterized by several analytical techniques: $^{13}$C NMR, GPC, melting point.

$^{13}$C NMR (CDCl$_3$) 75.47 MHz (J-Modulated spin echo method) δ173. 045 (carbonyl stearoyl), δ170.34 (carbonyl sebacoyl), δ66.51 (-ve intensity, CHOH, poly(vinyl alcohol)), δ39.50 (CH$_2$, poly(vinyl alcohol)), δ34.33 ( (C$_2$, stearoyl), δ31.91 (C$_5$, C$_6$), δ29.73, 29.36 (C$_6$–C$_{15}$), δ24.79 (C$_3$), δ22.67 (C$_{17}$), δ14.09 (-ve intensity, C$_{18}$) .

GPC: Weight average molecular weight ~80,500, purity 97%.

Melting point: Determined by differential scanning calorimetry was found to be 52°–53° C.

EXAMPLE 6

Preparation of Canola oil gel

The polymer prepared as described in Example 5 was incorporated into Canola oil to obtain a shortening-like product similar to CRISCO® brand shortening, The polymer (5% by weight) prepared as described in Example 5 was dispersed in 45 g Canola oil, The mixture was stirring using a magnetic stirrer and heated to a minimum of 60° C. (but no higher than 90° C.), The stirring was continued until all the polymer dissolved. The resulting solution of the polymer in Canola oil was solidified by placing the mixture on ice for at least one hour, The gel was stored and characterized by rheological measurements, Rheological measurements of the gelled oil were conducted on a Bholin Visco 88 viscometer at both 4° C. and 37° C., The viscosities were measured using both increasing and decreasing shear rates, The initial viscosity (at the lowest shear rate 21.16 sec$^{-1}$ on the increasing rate measurement) was used to determine the viscosity of the gelled product, The temperature of the sample during the measurement was maintained by constant temperature baths. The viscosities of the gelled Canola oil containing 5% of the polymer at 4° C. and 37° C. were 10.02 Pas and 5.63 Pas, respectively,

EXAMPLE 7

Preparation of emulsions without emulsifiers

The polymer of Example 5 was used to prepare oil continuous emulsions using liquid oil without any structured or saturated fat, The emulsions consisted of an aqueous phase which included salts and whey protein and an oil phase which included the polymer, The oil phase was varied from 80–60% and the polymer from 2 to 5%, A typical formulation for 80% oil phase containing 2% of the polymer (prepared as described in Example 5) is given below:

|  | % in Final Product |
|---|---|
| OIL PHASE |  |
| Canola Oil (Procter & Gamble Co.) | 75 |
| Polymer (Example 5) | 5 |
| WATER PHASE |  |
| Water | 18 |
| Sodium chloride | 2 |

The polymer was dispersed in the oil phase and heated to about 65° C. (but no higher than 90° C.) and mixed until all the polymer dissolved. The aqueous phase containing sodium chloride and whey protein was prepared by heating the mixture with stirring to a minimum of 65° C. (but no higher than 70° C.) and continuing the mixing until all the solids had dissolved.

When both phases had reached the appropriate temperatures, the aqueous phase was slowly poured into the stirred oil phase. The emulsion was assembled under shear using a Silverson L4R (Silverson Machines Limited) for a total of 2 minutes. Care was taken to avoid the inclusion of air in the emulsion. When the emulsification was complete, the emulsion was placed on ice and allowed to solidify for at least 1 hour.

The viscosity of the final product was measured at both 4° C. and 37° C. according to the procedure described in Example 6. The results are given in Table I.

TABLE I

| % Oil Phase in Final Phase | % Polymer in Final Product | Viscosity at 4° C. (Pas) | Viscosity at 37° C. (Pas) |
|---|---|---|---|
| 80 | 5 | 14.77 | 11.29 |
| 60 | 5 | over range | 14.12 |
| 60 | 2 | 13.37 | 8.32 |

EXAMPLE 8

Preparation of emulsions with emulsifiers

The polymer (prepared as described in Example 5) was used to prepare oil continuous emulsions using liquid oil (without any structured or saturated fat) and emulsifiers in the oil phase. The emulsions were prepared as described in Example 7, except that a total of 9% emulsifier was included in the oil phase. A typical formulation for 89% oil phase containing 5% of the polymer (prepared as described in Example 5) is given below:

|  | % in Final Product |
|---|---|
| OIL PHASE |  |
| Canola Oil (Procter & Gamble Co.) | 75 |
| Polymer (Example 1) | 5 |
| Span 80 (Sigms Chemical Co.) | 4 |
| Tween 80 (Spectrum Chemical Mfg. Corp.) | 4 |
| Dimodan WPC (Grinstad Products Inc.) | 1 |
| WATER PHASE |  |
| Water | 10 |
| Sodium chloride | 1 |

The emulsion was prepared as described in Example 7. The viscosity of the oil continuous emulsion containing 80% oil phase, 5% polymer at 4° C. and 37° C. measured as described in Example 6 were 11.64 Pas and 7.79 Pas, respectively.

EXAMPLE 9

Synthesis of crosslinked polymer derived from poly(vinyl alcohol) molecular weight 9000–10,00.0, palmitoyl chloride and sebacoyl chloride.

Poly(vinyl alcohol), average molecular weight 9000–10,000 (220 mg, 5 mM based on vinyl alcohol; Aldrich Chemical Co.) was dissolved in dry N,N-dimethylformamide (2 mL) at 100° C. Sebacoyl chloride (12 mg, 0.05 mM; Aldrich Chemical Co.) was dissolved in dry N,N-dimethylformamide (0.5 mL) and added to the dissolved poly(vinyl alcohol). The mixture was stirred at 70° C. After ~5 minutes a solution of palmitoyl chloride (1.37 g, 5 mM; Aldrich Chemical Co.) in dry N,N-dimethylformamide (1.5 mL) was added. The mixture was stirred at 70° C. for 2 hours. The reaction mixture was then poured into ethanol (50 mL) and the resulting precipitate was filtered under vacuum. The solid was air dried to give 1.01 g of the crude polymer (72% yield). The molecular weight of the crude polymer determined by GPC as described in Example 5 has a single peak of weight average 60,600. The polymer (without further purification) was used to prepare a Canola oil gel as described in Example 5. The resulting product containing 10% polymer was a gel at 4° C. but liquid at 25° C.

EXAMPLE 10

Synthesis of crosslinked polymer derived from poly(vinyl alcohol) molecular weight 50,000, stearoyl chloride and sebacoyl chloride.

A polymer derived from poly(vinyl alcohol) average molecular weight 50,000, stearoyl chloride and sebacoyl chloride was synthesized by a modification of the procedure described in Example 5. Poly(vinyl alcohol), average molecular weight 50,000 (44 mg, 1 mM based on vinyl alcohol; Aldrich Chemical Co.) was dissolved in dry N,N-dimethylformamide (3 mL) by heating the solution to ~150° C. A mixture of stearoyl chloride (303 mg, 1 mM; Aldrich Chemical Co.) and sebacoyl chloride (2.4 mg, 0.01 mM; Aldrich Chemical Co.) were dissolved in dry N,N-dimethylformamide (2 mL) and then added to the dissolved poly(vinyl alcohol) at 70° C. The solution was stirred at 70° C. for 1 hour. The mixture was then poured into dry ethanol (50 mL) and the resulting precipitate was filtered under vacuum. The solid was air dried and the molecular weight of the crude polymer was determined by GPC as described in Example 5. The polymer was a mixture of weight averages 169,00 and 740 in a ratio of 3:1. The crude polymer was used to prepare a Canola oil gel as described in Example 6. The resulting gel containing 10% polymer was softer than the gel prepared with the polymer as described in Example 5.

EXAMPLE 11

Synthesis of crosslinked polymer derived from poly(vinyl alcohol) molecular weight 50,000, palmitoyl chloride and sebacoyl chloride.

The polymer derived from poly(vinyl alcohol) average molecular weight 50,000, palmitoyl chloride and sebacoyl chloride was synthesized by a modification of the procedure described in Example 10. Poly(vinyl alcohol), average molecular weight 50,000 (44 mg, 1 mM based on vinyl alcohol; Aldrich Chemical Co.) was dissolved in dry N,N-dimethylformamide (2 mL) by heating the solution to 140° C. A mixture of palmitoyl chloride (275 mg, 1 mM; Aldrich Chemical Co.) and sebacoyl chloride (2.4 mg, 0.01 mM; Aldrich Chemical Co.) were dissolved in dry N,N-dimethlformamide (2 mL) and then added to the dissolved poly(vinyl alcohol) at ~140° C. The solution was then stirred at 140° C. for 5 minutes and then left stirring at 70° C. for 40 minutes. The mixture was then poured into dry ethanol (3 mL) and the resulting precipitate was filtered under vacuum. The solid was air dried and the molecular weight of the crude polymer was determined by GPC as described in Example 5. The polymer was a mixture of weight averages $2.7 \times 10^6$, 240,000 and 650 in a ratio of 1:13:1.4. The crude polymer was used to prepare a Canola oil gel as described in Example 6. The resulting gel containing 10% polymer was softer than the gel prepared with the polymer as described in Example 5.

EXAMPLE 12

Preparation of poly(hexadecylmethyacrylate) gel using Canola oil

A solution of poly(hexadecylmethacrylate) in toluene (Aldrich Chemical Co.) was rotary evaporated under vacuum to remove the solvent. The polymer was then incorporated into Canola oil to obtain a shortening-like product similar to CRISCO® brand shortening. The polymer (20% by weight) was dispersed in 90 g Canola oil. The mixture was stirring using a magnetic stirrer and heated to a minimum of 60° C. (but no higher than 90° C.). The stirring was continued until all the polymer dissolved. The resulting solution of the polymer in canola oil was place on ice for at least one hour to solidify. The product was a gel at 4° C. and a liquid at room temperature.

EXAMPLE 13

Preparation of poly(octadecylmethacrylate) gel using Canola oil

A solution of poly(octadecylmethacrylate) in toluene (Aldrich Chemical Co.) was rotary evaporated under vacuum to remove the solvent. The polymer was then incorporated into Canola oil to obtain a shortening-like product similar to CRISCO® brand shortening. The polymer (20% by weight) was dispersed in 90 g Canola oil. The mixture was stirring using a magnetic stirrer and heated to a minimum of 60° C. (but no higher than 90° C.). The stirring was continued until all the polymer dissolved. The resulting solution of the polymer in canola oil was place on ice for at least one hour to solidify. The product was a gel at 4° C. and a liquid at room temperature.

EXAMPLE 14 preparation of poly(ethylene glycol 400) distearate gel using Canola oil

Poly(ethylene glycol 400) distearate (Aldrich Chemical Co.) was incorporated into Canola oil to obtain a shortening-like product similar to CRISCO® brand shortening. The polymer (20% by weight) was dispersed in 90 g Canola oil. The mixture was stirring using a magnetic stirrer and heated to a minimum of 60° C. (but no higher than 90° C.). The stirring was continued until all the polymer dissolved. The resulting solution of the polymer in canola oil was place on ice for at least one hour to solidify. The product was a gel at 4° C. and a liquid at room temperature.

EXAMPLE 15

Synthesis of alkyd-type polymer from monoglycerides and aconitic acid

Thirty-four and a half grams (34.5 g) of C22 monoglycerides derived from hydrogenated vegetable oil (PA-28, Kodak, Eastman Chemicals Division, Kingsport, Tenn.) were placed in a round-bottom 100 mL flask and melted at 140° C. Eight grams of aconitic acid monohydrate (Sigma Chemical Company, St. Louis, Mo.) were then added under stirring. The above weight ratio resulted in 1/1.75 molar ratio of aconitic acid to monoglycerides. Vacuum was applied (6–10 mm Hg) and the temperature was raised to 200° C. After 3 h minutes, 210 mg of phosphoric acid were added and the reaction mixture was stirred at 200° C. and under vacuum for another 22 hours, forming the polymer.

The polymer was cooled to room temperature, homogenized to a powdered state and thoroughly washed with methanol to remove the catalyst. The molecular weight of the resulting polymer (determined by GPC with different MW polystyrenes as standards) was found to be around 32,000. The product melting properties were determined by differential scanning calorimetry (DSC). The melting point was found to be about 60° C.

EQUIVALENTS

Those skilled in the art will recognize, or be able to ascertain using no more than routine experimentation, many equivalents to the specific embodiments of the invention described herein. Such equivalents are intended to be encompassed by the following claims.

We claim:

1. An edible food product containing an oil phase thickened with a texturizing agent present in an amount sufficient to significantly increase the viscosity of the oil phase of said edible food product, said texturizing agent comprising an alkyl-substituted, non-nitrogen containing oil-soluble polymer having a molecular weight of at least about 2000 daltons.

2. An edible food product of claim 1 wherein said polymer is selected from the group consisting of methacrylate polymers, polyglycol esters, polyvinyl alcohol esters, and polyvinyl alcohol esters crosslinked with a polycarboxylic acid.

3. An edible food product of claim 2 wherein the oil phase comprises canola oil, soybean oil, sunflower oil, peanut oil, safflower oil, olive oil or corn oil.

4. An edible food product of claim 2 wherein the oil phase comprises hydrogenated vegetable oil, butter fat or cocoa butter.

5. An edible food product of claim 2 wherein the polymer comprises from about 2% to about 20%, by weight, of the oil phase of said edible food product.

6. An edible emulsion comprising an aqueous phase and an oil phase thickened with a texturizing agent comprising an alkyl-substituted, non-nitrogen containing oil-soluble polymer having a molecular weight of at least about 2000 daltons.

7. An edible emulsion of claim 6 wherein said polymer is selected from the group consisting of methacrylate polymers, polyglycol esters, polyvinyl alcohol esters, and polyvinyl alcohol esters crosslinked with a polycarboxylic acid.

8. An edible emulsion of claim 6 wherein the oil phase comprises from about 20% to about 80%, by weight, of the emulsion.

9. A fat-containing food product in which all or part of the fat is substituted with an oil phase thickened with a texturizing agent present in an amount sufficient to significantly increase the viscosity of the oil phase of said edible food product, said texturizing agent comprising an alkyl-substituted, non-nitrogen containing oil-soluble polymer having a molecular weight of at least about 2000 daltons.

10. A food product of claim 9 wherein said polymer is selected from the group consisting of methacrylate polymers, polyglycol esters, polyvinyl alcohol esters, and polyvinyl alcohol esters crosslinked with a polycarboxylic acid.

11. A fat-containing food product in which all or part of the fat is substituted with an oil phase thickened with a texturizing agent comprising an alkyl-substituted, non-nitrogen containing oil-soluble polymer having a molecular weight of at least about 2000 daltons.

12. A food product of claim 11 wherein said polymer is selected from the group consisting of methacrylate polymers, polyglycol esters, polyvinyl alcohol esters, and polyvinyl alcohol esters crosslinked with a polycarboxylic acid.

13. An edible food spread containing an emulsion comprising an aqueous phase and an oil phase thickened with a texturizing agent comprising an alkyl-substituted, non-nitrogen containing oil-soluble polymer having a molecular weight of at least about 2000 daltons.

14. An edible food spread of claim 13 wherein said polymer is selected from the group consisting of methacrylate polymers, polyglycol esters, polyvinyl alcohol esters, and polyvinyl alcohol esters crosslinked with a polycarboxylic acid.

15. A baked food product in which all or part of the hydrogenated fat normally present is substituted with an oil phase comprising an unsaturated oil thickened with a texturizing agent present in an amount sufficient to significantly increase the viscosity of the oil phase, said texturizing agent comprising an alkyl-substituted, non-nitrogen containing oil-soluble polymer having a molecular weight of at least about 2000 daltons.

16. A product of claim 15 wherein said polymer is selected from the group consisting of methacrylate polymers, polyglycol esters, polyvinyl alcohol esters, and polyvinyl alcohol esters crosslinked with a polycarboxylic acid.

17. A baked food product in which all or part of the hydrogenated fat normally present is substituted with an emulsion comprising an aqueous phase and an unsaturated oil thickened with a texturizing agent comprising an alkyl-substituted, non-nitrogen containing oil-soluble polymer having a molecular weight of at least about 2000 daltons.

18. A product of claim 17 wherein said polymer is selected from the group consisting of methacrylate polymers, polyglycol esters, polyvinyl alcohol esters, and polyvinyl alcohol esters crosslinked with a polycarboxylic acid.

* * * * *